US010655006B2

(12) United States Patent
Restuccia et al.

(10) Patent No.: US 10,655,006 B2
(45) Date of Patent: May 19, 2020

(54) BINDER-TREATED FIBROUS MATERIALS

(71) Applicant: CYTEC TECHNOLOGY CORP., Wilmington, DE (US)

(72) Inventors: Carmelo Luca Restuccia, Chester (GB); Gerald Hobisch, Hart Bel Graz (AT); William Jacobs, Bethel, CT (US); Dominique Ponsolle, Winona, MN (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 0 days.

(21) Appl. No.: 15/885,946

(22) Filed: Feb. 1, 2018

(65) Prior Publication Data

US 2018/0155542 A1    Jun. 7, 2018

Related U.S. Application Data

(62) Division of application No. 13/915,651, filed on Jun. 12, 2013, now Pat. No. 9,920,197.

(60) Provisional application No. 61/739,748, filed on Dec. 20, 2012.

(51) Int. Cl.
*C08L 63/00* (2006.01)
*D04H 5/04* (2006.01)
*D06M 15/55* (2006.01)

(52) U.S. Cl.
CPC ............... *C08L 63/00* (2013.01); *D04H 5/04* (2013.01); *D06M 15/55* (2013.01); *Y10T 442/2738* (2015.04); *Y10T 442/30* (2015.04); *Y10T 442/60* (2015.04)

(58) Field of Classification Search
USPC .................................. 442/149–150; 524/609
See application file for complete search history.

(56) References Cited

U.S. PATENT DOCUMENTS

| 4,448,911 A | 5/1984 | Haines et al. |
| 4,945,154 A | 7/1990 | Ghali et al. |
| 5,639,813 A * | 6/1997 | Jablon ................. C08G 81/028 524/365 |
| 6,066,395 A | 5/2000 | Miyoshi et al. |
| 6,271,287 B1 | 8/2001 | Piechocki et al. |
| 7,026,411 B1 | 4/2006 | Carter et al. |

(Continued)

FOREIGN PATENT DOCUMENTS

| EP | 0814916 B1 | 2/2003 |
| EP | 1662044 B1 | 7/2009 |

(Continued)

OTHER PUBLICATIONS

International Search Report. PCT/US2013/057197. dated May 28, 2014.

*Primary Examiner* — Lynda Salvatore
(74) *Attorney, Agent, or Firm* — Thi Dang (57) ABSTRACT

A liquid binder composition for binding fibrous materials in the fabrication of resin-infusible preform is disclosed. The binder composition is an aqueous dispersion containing (a) one or more multifunctional epoxy resins, (b) at least one thermoplastic polymer, (c) one or more surfactants selected from anionic surfactants, nonionic surfactants, and combinations thereof, (d) water, and is essentially free of organic solvents. Also disclosed is an emulsification process for producing the liquid binder composition.

6 Claims, 1 Drawing Sheet

(56) References Cited

U.S. PATENT DOCUMENTS

| | | |
|---|---|---|
| 7,250,381 B2 | 7/2007 | Jaffee |
| 9,074,091 B2* | 7/2015 | Kawazoe ............... C08L 63/00 |
| 2004/0030061 A1* | 2/2004 | McGrail .................. C08J 5/24 |
| | | 525/537 |
| 2004/0043144 A1 | 3/2004 | Carter et al. |
| 2006/0105662 A1 | 5/2006 | Jaffee |
| 2007/0246144 A1 | 10/2007 | Jaffee |
| 2009/0092831 A1 | 4/2009 | Stusgen et al. |
| 2010/0056628 A1* | 3/2010 | Stockel ................. A01N 25/30 |
| | | 514/551 |
| 2011/0313081 A1 | 12/2011 | Schroetz |
| 2015/0252184 A1 | 9/2015 | Arai et al. |

FOREIGN PATENT DOCUMENTS

| | | |
|---|---|---|
| WO | 1999016720 A1 | 4/1999 |
| WO | 2005095080 A1 | 10/2005 |
| WO | 2007100816 A2 | 9/2007 |
| WO | 2008073503 A1 | 6/2008 |
| WO | 2008147746 A1 | 12/2008 |
| WO | 2009055403 A2 | 4/2009 |
| WO | 2010061114 A1 | 6/2010 |
| WO | 2012064525 A1 | 5/2012 |

\* cited by examiner

BINDER-TREATED FIBROUS MATERIALS

The instant application is a divisional application of U.S. application Ser. No. 13/915,651 filed on Jun. 12, 2013, which claims the benefit of U.S. Provisional Patent Application No. 61/739,748 filed on Dec. 20, 2012, both of which are incorporated by reference in their entirety.

BACKGROUND

Fiber-reinforced polymer composites have been used in the construction of load bearing articles, typically in marine, automotive, aerospace and construction industries. These composites typically contain fibrous reinforcement such as glass fibres and carbon fibres, embedded in a cured matrix resin.

Fiber-reinforced polymer composites are traditionally made from prepreg sheets of resin-impregnated fibers, which are laid up, molded and cured. The resin content in the prepregs is high, typically 20%-50% by weight. The prepreg properties and quality are controlled for toughness, strength, flexibility and the like. Prepreg sheets may be cut to smaller sizes for laying up in the construction of a given article.

In recent years, resin infusion technologies have been utilized to manufacture complex-shaped structures which are otherwise difficult to manufacture using conventional prepreg technology. Resin infusion technologies include Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process) and Single Line Injection (SLI). Resin infusion differs from that of conventional prepreg technology in that dry structural reinforcement fibers are arranged in a mold as a preform, then the preform is injected or infused directly in-situ with the resin matrix. After resin infusion, the resin-infused preform is cured to form a hardened composite part. The preform typically consists of a plurality of layers of fibrous materials, such as unidirectional fibers or woven fabrics, which are assembled via a layup process to form a predetermined shape and held in place by stitching, stapling or bonding using binders. Preform fabrication often requires the cutting (or slitting) of dry fabrics or fibres to certain size and/or shape. The limitations of these conventional fibrous products lies in the inability to slit and apply these products via an automated lay down process without deforming and fraying the edges.

Binders have been used in the fabrication of dry preforms for various purposes such as to provide cohesion of the reinforcement fibers, to bind layers of reinforcement fibers, and to provide tack so the fibrous material remains in a stationary position during the layup process. Although there are commercially available binders such as solvent-borne binders and binders in powder form, there are disadvantages associated with each type. As such, there remains a need for a binder composition that can be applied in an environmentally friendly manner, and can improve the handling, slitting and shaping of the fibrous materials that are used for the fabrication of dry preforms.

SUMMARY

Disclosed herein is a liquid binder composition that is suitable for binding fibrous materials that are to be used in the fabrication of dry preforms. The liquid binder composition is an aqueous dispersion containing (a) one or more multifunctional epoxy resins, (b) at least one thermoplastic polymer, (c) one or more surfactants selected from anionic surfactants, nonionic surfactants, and combination thereof, and (d) water, and is essentially free of organic solvents. Moreover, the binder composition is formulated to have a solid content and a viscosity level that enable application by dip-coating or spraying at ambient temperature (20° C.-25° C.). It has been discovered that the presence of the binder composition in the fibrous materials improves the handling, slitting and shaping of the fibrous materials. Furthermore, the binder composition is particularly suitable for the treatment of fibrous materials to be used in automated laydown processes. Also disclosed herein is the method of preparing the binder composition.

DETAILED DESCRIPTION

The present disclosure provides a liquid binder composition to be introduced into the fibrous materials making up the preform. The binder composition can be applied in an environmentally friendly manner, and can improve the handling, slitting and shaping of the fibrous materials that are used for the fabrication of dry preforms. In the case of preforms with complex shapes, the binder composition in the fibrous materials enables the preform to hold its shape during injection of the preform with a liquid matrix resin. It is desirable that the binder composition does not impede the layup operation or the composite manufacture, and in particular, the resin injection process. In addition, the binder composition generally should not affect the mechanical performance of the resulting composite derived from such preform nor considerably lower the composite's glass transition temperature ($T_g$). To that end, the liquid binder composition of the present disclosure is formulated so as to be chemically compatible with the resin matrix, particularly epoxy-based resin, which is to be injected into the preform.

The binder composition of the present disclosure is an aqueous dispersion containing (a) one or more multifunctional epoxy resins, (b) at least one thermoplastic polymer, (c) one or more surfactants selected from anionic surfactants, nonionic surfactants, and combinations thereof, (d) water, and is essentially free of organic solvents. Optional additives such as organic or inorganic fillers and a defoamer may also be included in the binder composition.

The liquid binder composition is preferably produced by a high-shear emulsification process and may have the following properties: solid content within the range of 45%-70% based on the total weight of the composition, and particle size distribution in the range of 50 nm-10000 nm;

The binder emulsion produced from the emulsification process has been shown to be stable for several weeks at the above solid content, and can yield a stable emulsion of lower solid content, e.g. 0.1%-10%, upon dilution with deionized water. As such, the binder emulsion can be applied to fibrous materials used in the fabrication of preform when the emulsion has been sufficiently diluted to achieve a low solid content that is appropriate for preform fabrication.

Generally, the amount and type of multifunctional epoxy resins is the amount sufficient to achieve viscosity level that is compatible for high-shear emulsification and to produce binder-treated fibrous material with no tack at room temperature and sufficient levels of tack at temperatures above 70° C. The thermoplastic nature, number average molecular weight, content, type and content of chain end or pendant groups are sufficient to toughen the binder composition without disrupting the ionic balance of the emulsion, and is selected to maintain the desired viscosity level. The amount of surfactant(s) is the amount sufficient to emulsify the epoxy/thermoplastic mixture and to stabilize the binder emulsion.

In one embodiment, the relative amounts of the components in the binder composition, in weight percentages based on the total weight of the composition, are as follows:
0.1-70% one or more multifunctional epoxy resin(s)
0.01-30% one or more thermoplastic polymer(s)
0.01-15% one or more surfactant(s)
0.001-10% optional additive(s)
water making up the balance,
wherein the optional additives include a defoamer, such as a polysiloxane, a fluorocarbon, mineral oils, or an acetylene-based defoamer, however, other compounds that can lower surface tension and/or break down foam by other means may also be utilized.

To prepare the binder composition, the thermoplastic polymer(s) and multifunctional epoxy resin(s) are typically blended together first, optionally with heating to disperse and/or dissolve the thermoplastic polymer(s) into the epoxy resin(s). The surfactant(s) and optionally additives are added and fully dispersed into the resin blend to form a resin mixture. Next, the resin mixture is poured into a mixing device, e.g. high-shear mixer equipped with an open vessel connected to a recirculating heating system. Mixing is then carried out at a relatively elevated temperature while gradually adding water to emulsify the resin mixture. Alternatively, the resins are added (with or without surfactant) to the water phase (often containing the surfactant) under the conditions of shear. This is called the direct method of making emulsion. Additives may also be added to the binder composition during or after the emulsification or dilution steps prior to the application to the fibrous substrate.

In one embodiment, the temperature within the high-shear mixer during emulsification is 90° C.-110° C. The temperature should be sufficient to ensure that the binder composition is capable of being uniformly agitated under shear so as to allow water to be incorporated, but not so high as to cause the water to boil away rapidly at the given pressure in the reactor. Nor should the temperature be so high that the components of the composition undergo undesired side reactions, such as hydrolysis or advancement. The shear rate of the mixer is initially set at a low value, then at the inversion point (when the solid-in-liquid mixture becomes a more homogeneous phase), higher shear rate is applied to reduce particle size and to ensure optimum homogenization and emulsion stability. Sufficient amount of water is added to the mixer during emulsification to achieve the desired solid content and viscosity. Additional additives such as defoamers may be added to the binder composition prior to the application to the fibrous product.

The liquid binder composition of the present disclosure provides several advantages including:
(i) Dispersability in water, thus, the composition is environmentally friendly;
(ii) Ability to homogeneously coat fibrous tows in fabrics, thereby enhancing the fiber tows' integrity;
(iii) Suitability to existing textile manufacturing processes;
(iv) Providing adequate levels of adhesion/compatibility to conventional epoxy-based resin matrix that has been used for resin infusion;
(v) Ability to minimize/eliminate the variability in bondability normally observed in powder coated textiles;
(vi) Limited or no impact on the thermo-mechanical performance of the composite part produced from a fibrous preform that has been treated with the liquid binder.

Furthermore, the liquid binder composition of the present disclosure provides several advantages over conventional powder-form binders. Binder in solid form not only requires expensive grinding and sieving equipment to produce the necessary fine uniform powders, but also requires expensive powder coating equipment in order to apply it effectively on the fibrous materials or fabrics. Furthermore, the application of a powder provides a spotty, non-uniform application to the fibrous materials or fabrics that may not impart the optimal bonding properties desired for laying up. Powders tend also to be easily peeled off the fibrous substrate when subjected to friction during the handling and lay-down, especially in automated processes, resulting in additional variation and defects due to the lack on tack in specific points. In contrast, the aqueous, emulsified liquid binder compositions of the present disclosure provides the capability of incorporating solid components, such as high $T_g$ solid thermoplastics, into a low-viscosity, organic solvent-free aqueous composition. Such low-viscosity, solvent-free aqueous composition can now be easily homogeneously applied by conventional dipping, roller coating or spraying processes, thereby providing additional benefits which include ease of processing, increased automation, and cost savings.

Multifunctional Epoxy Resins

The one or more multifunctional epoxy resins in the binder composition are those polyepoxides containing an average of two or more epoxy groups (oxirane rings) per molecule with the epoxy groups being the terminal groups. A di-functional epoxy resin is an epoxy resin that contains an average of two epoxy groups per molecule, a tri-functional epoxy resin is an epoxy resin that contains an average of three epoxy groups per molecule, and a tetra-functional epoxy resin contains an average of four epoxy groups per molecule. In a preferred embodiment, the multifunctional epoxy resin has an average epoxy equivalent weight (EEW) in the range of 90-240 g/eq. An epoxy equivalent weight is the molecular weight of the epoxy molecule divided by the number of epoxy groups in the molecule. Thus, for example, a di-functional epoxy having a molecular weight of 400 would have an epoxy equivalent weight of 200. In one embodiment, the binder composition contains a plurality of multifunctional epoxy resins, including one or more tri-functional epoxy resins.

In general, the multifunctional epoxy resins that are suitable for the binder composition may be saturated, unsaturated, cyclic or acyclic, aliphatic, alicyclic, aromatic or heterocyclic polyepoxides. Examples of suitable polyepoxides include polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. Also suitable are the polyglycidyl ethers of polyalcohols, aminophenols or aromatic diamines.

Other types of polyepoxides which may be used are glycidyl polyester resins prepared by reacting an epichlohydrin with an aromatic or aliphatic polycarboxylic acid. Another type of polyepoxide resin is a glycidyl amine which is prepared by reacting a polyamine with an epichlorohydrin. Other suitable multifunctional epoxy resins include multifunctional epoxy novolac resins with two or more epoxy groups. The epoxy novolac resins that are useful include epoxy cresol novolacs and epoxy phenol novolacs. Additional suitable multifunctional epoxy resins include aliphatic multifunctional epoxy such as polyglycidyl ether type epoxy, and sorbitol glycidyl ether.

Examples of di-functional epoxy resins include diglycidyl ethers of bisphenol A such as Epon™ 828 from Momentive, DER® 331, DER.® 661, supplied by Dow Chemical Co., Tactix® 123 from Huntsman Advanced Materials, digylcidyl ethers of bisphenol F epoxy such as PY306 available from Huntsman Advanced Materials and diglycidyl 1,2-phthalate (e.g. GLY CEL A-100);

Examples of tri-functional epoxy resins include triglycidyl ether of aminophenol, e.g. Araldite® MY 0510, MY 0500, MY 0600, MY 0610, all available from Huntsman Advanced Materials, tris-(p-Hydroxyphenyl) Ethane based epoxy such as Epalloy® 9000 from Emerald Performance Materials or Epon 1031 from Momentive.

Examples of epoxy novolacs include DEN 354, 431, 438 and 439 from Dow Chemical Co., resorcinol modified Phenol Novolacs such as Erisys RN3650 from Emerald Performance Materials, di-cyclopentadiene-based phenolic Novolacs such as Tactix 556 and 756 from Huntsman Advanced Materials and 1050, SU-3 and SU-8 from Momentive. Examples of tetra-functional epoxy resins include Tetrad-X from Mitsubushi gas Company, Erisys® GA-240 from Emerald materials and Araldite® MY721 from Huntsman Advanced Materials. Other epoxy resin precursors include cycloaliphatics such as 3',4'-epoxycyclohexyl-3,4-epoxycyclohexane carboxylate (e.g. CY 179 from Huntsman).

Thermoplastic Polymer

In a preferred embodiment, the thermoplastic polymer in the binder composition is a polymer that is substantially insoluble in a curable thermoset resin system at room temperature (i.e., 20° C.-25° C.) or at conditions not sufficient for full curing of the thermoset resin, but is able to undergo at least partial phase transition to a fluid phase during the curing cycle of the thermoset resin. In other words, the thermoplastic polymer is a material which has no solubility (or negligible solubility) in the thermoset resin at room temperature or at conditions not sufficient for full curing of the thermoset resin, while its solubility is substantial (i.e., greater than 50% dissolves) or total (i.e., completely dissolves) during the curing cycle of the thermoset resin. The "thermoset resin system" refers to the multifunctional epoxy resins in the binder composition or the liquid matrix resin to be injected or introduced into the preform after fabrication of the preform. The matrix resin for preform injection contains one or more thermoset resins as the major component and minor amounts of additives such as curing agents, catalysts, rheology control agents, tackifiers, inorganic or organic fillers, elastomeric toughening agents, toughening particles, stabilizers, inhibitors, pigments/dyes, flame retardants, reactive diluents, and other additives well known to those skilled in the art for modifying the properties of the resin system before or after curing. The thermoset resins for resin infusion include epoxy resins, bismaleimide, vinyl ester resins, cyanate ester resins, isocyanate modified epoxy resins, phenolic resins, benzoxazine, formaldehyde condensate resins (such as with urea, melamine or phenol), polyesters, acrylics, and combinations thereof. In one embodiment, the thermoplastic polymer in the binder composition is soluble in an epoxy-based matrix resin upon curing of the matrix resin.

As used herein, the term "curing" refers to the hardening of a matrix resin by cross-linking of polymer chains, brought about by chemical additives, ultraviolet radiation, microwave radiation, electron beam, gamma radiation or other suitable thermal or non-thermal radiation.

The solubility property of the thermoplastic polymer in a curable thermoset resin system, as discussed in this context, can be determined by several known methodologies including optical microscopy, spectroscopy and the like.

For one material to be soluble in another material, the difference in their solubility parameters ($\Delta\delta$) should be as small as possible. The solubility parameter for a polymer may be determined by a calculation based on the group contribution method described by Van Krevelen (see D. W. Van Krevelen, *Properties of Polymers*, 3rd Revised Edition, Elsevier Scientific Publishing, Amsterdam, 1990, Chapter 7, pp 189-224).

The solubility parameter of a polymer may also be determined using the Hansen Solubility Parameters (HSP) as a way of predicting if one material will dissolve in another to form a solution. The Hansen parameters are based on the idea that "like dissolves like" where one molecule is defined as being 'like' another if it bonds to itself in a similar way.

Examples of resin-soluble thermoplastic polymers include, but are not limited to members of the group consisting of cellulose derivatives, polyester, polyamide, polyimide, polycarbonate, polyurethane, poly(methyl methacrylate), polystyrene, polyesteramide, polyamideimide, polyetherimide, polyaramide, polyarylate, polyacrylate, poly(ester) carbonate, poly(methyl methacrylate/butyl acrylate), polyarylether; polyarylsulphone; polyaryletherketone (PAEK) including polyetherketoneketone (PEKK) and polyetheretherketone (PEEK); combinations and copolymers thereof.

A particularly preferred thermoplastic polymer is a polyarylsulphone comprised of ether-linked repeating units and optionally thioether-linked repeating units, the units being selected from:

-(Ph-A-Ph)- and optionally

-(Ph)$_a$- wherein A is CO or SO$_2$, Ph is phenylene, n=1 to 2 and can be fractional, a=1 to 4 and can be fractional, with the proviso that when a exceeds 1, the phenylenes are linked linearly through a single chemical bond or a divalent group other than —CO— or —SO$_2$—, or are fused together directly or via a cyclic moiety selected from the group consisting of an acid alkyl group, a (hetero) aromatic, a cyclic ketone, a cyclic amide, an imide, a cyclic imine and combinations thereof.

Furthermore, the polyarylsulphone may have reactive pendant and/or end groups. The reactive pendant and/or end group is a group reactive with epoxide groups or with a curing agent. Examples of reactive groups are those that provide active hydrogen, such as OH, NH$_2$, NHR' or —SH, where R' is a hydrocarbon group containing up to 8 carbon atoms, or groups that provide cross-linking activity such as epoxy, (meth)acrylate, (iso)cyanate, isocyanate ester, acetylene or ethylene as in vinyl or allyl, maleimide, anhydride, and oxazoline.

In one embodiment, the polyarylsulphone contains repeating units of -(PhSO$_2$Ph)-, wherein the -(PhSO$_2$Ph)- unit is present in the polyarylsulphone in such a proportion that on average at least two of said unit -(PhSO$_2$Ph)$_n$- are in sequence in each polymer chain present, and also contain reactive pendant or end groups as discussed above.

In one embodiment, the polyarylsulphone is a copolymer containing the following units:

X-PhSO$_2$Ph-X-PhSO$_2$Ph ("PES") and     (I)

X-(Ph)$_a$-X-PhSO$_2$Ph ("PEES")     (II)

wherein X is O or S and may differ from unit to unit, and a is 1-4. In some embodiments, the molar ratio of I to II is from about 10:90 and 80:20, from about 10:90 and 55:45, from about 25:75 and 50:50, from about 20:80 and 70:30, from about 30:70 and 70:30, or from about 35:65 and 65:35. In another embodiment, the PES:PEES copolymer has reactive amine end groups.

The number average molecular weight of the polyarylsulphone polymer discussed above is preferably in the range of 2000 to 30,000, especially in the range of 3000 to 15,000, or 3000 to 13,000. In certain embodiments, the polyarylsulphone polymer has a glass transition temperature ($T_g$) of greater than 150° C. as measured by Differential scanning calorimetry (DSC). The particular $T_g$ is dependent upon the molecular weight of the polymer.

Surfactants

The surfactant(s) for the binder composition may be selected from nonionic surfactants and anionic surfactants or combination of both types.

Suitable nonionic surfactants are mono or multi-functional block or graft block copolymers comprising hydrophilic and hydrophobic blocks. The nonionic surfactant can comprise a backbone moiety, hydrophobic blocks and hydrophilic blocks which may be part of the backbone or which project substantially or in their entirety from the backbone moiety to form grafts, or a mixture of the two.

Suitable hydrophilic blocks are typically derived from polyvalent hydrophilic block precursors. Suitably the hydrophilic blocks are derived from hydrophilic block precursor molecules which are polyols or polyamines. Preferred hydrophilic polymers are polyethyleneoxides. Alternatively poly (ethylene-propylene oxide) or poly(ethylene-butylene oxide) may be used provided they achieve the desired water solubility criteria.

Particularly suitable nonionic surfactants are block copolymers such as polyoxamers represented by the following formula:

(EO)$_x$-(PO)$_y$-(EO)$_z$ wherein x, y, z=integers or fractions provided that the ratio of (x+z) to y is 1.32 or higher, or polyoxamines represented by the formula:

wherein (a, b, c, d, e, f, g, h=integers or fractions).

The nonionic surfactant is characterized by the content of ethylene oxide being in the range of 20%-99% by weight, and by having a number average molecular weight in the range of 1000 g/mol-100,000 g/mol.

A suitable anionic surfactant is characterized by the following formula:

A-R wherein R is an alkyl, or an aryl, or aryl-alkyl, or an alkylene chain having 4-50 carbon atoms ($C_4$ to $C_{50}$); and A is lithium, sodium, potassium, ammonium, quaternary ammonium or amine salt of a carboxylic-, or sulfonic-, or phosphoric acid group.

More specific examples of anionic surfactants include, but are not limited to: alkylaryl sulfonate; dioctylsulfosuccinate sodium salt; laurylsulfonate; fatty acid salts; fatty alcohol such as ethoxylate phosphate; and the category of Secondary Alkyl Sulfonates (SAS)—these surfactants contain secondary sulfonate group and show low foaming properties.

Optional Additives

The binder composition may further include additional crosslinkers such as aminoplasts, phenolics, azlactones, aziridines, blocked isocyanates and optional additives such as de-foamers, fungicides rheology control agents, tackifiers, inorganic or organic micro or nanofillers, elastomeric or thermoplastic toughening agents, toughening particles, stabilizers, inhibitors, pigments/dyes, flame retardants, reactive diluents, and other additives well known to those skilled in the art for modifying the properties of the binder, before and during the emulsification, the application to the fibrous substrate, the infusion and cure of the matrix resin. Suitable defoamers include, but are not limited to, acetylene diols, silicones, and mineral oils. Examples of nanofillers include but is not limited to components referred to in the art as nanosilica, poly polyhedral oligomeric silsesquioxane (POSS), carbon nano-tubes (CNTs), boron nitride nano-tubes, carbon nano-particles, carbon nano-fibres, boron nitride nano-fibres, carbon nano-ropes, boron nitride nano-ropes, carbon nano-ribbons, boron nitride nano-ribbons, carbon nano-fibrils, boron nitride nano-fibrils, carbon nano-needles, boron nitride nano-fibrils, carbon nano-sheets, carbon nano-rods, boron nitride nano-rods, carbon nano-cones, boron nitride nano-cones, carbon nano-scrolls, boron-nitride nano-scrolls, carbon nano-ohms, boron nitride nanoohms, graphite nano-platelets or nano-dots, graphenes, chopped/short carbon fibers, carbon black or a combination thereof with or without a partial or total metallic coating or other fullerene materials and combinations thereof.

The optional additives, if present, make up less than 15% based on the total weight of the composition.

Fibrous Materials and Preform Fabrication

Contemplated herein is a fibrous material containing 1% to 190% by weight of the binder composition distributed therein or coated thereon.

In the fabrication of a preform, layers of fibers or fabric plies are laid up dry in a stacking arrangement. Cutting or slitting of the fibrous layers to certain sizes is sometimes necessary prior to the layup operation. Thereafter, the laid-up material is infused with the matrix resin in a liquid infusion process such as RTM, and the infused preform is cured to form a hardened composite part.

The liquid binder composition disclosed herein may be distributed as desired throughout the fibrous materials or delivered as a surface coating either before or during preform layup. Surface coating may be applied onto one or both sides of the fibrous layer (e.g. fabric ply) that is used for laying up the preform. The method of delivery may be spraying, liquid immersion, roller-coating, or electro-coating. Electro-coating is possible when the fibrous material is made of conductive fibers, e.g. carbon fibers. Preferably, the liquid binder composition is delivered to the fibrous material as a surface coating. The binder content in the preform is about 20% or less, in some embodiments, 2%-10% by weight based on the total weight of the preform. The preform is configured for receiving liquid resin via resin infusion due to its permeability. This is in contrast to resin-impregnated prepreg plies used in conventional prepreg layup process, which typically contain 20%-50% by weight of matrix resin.

In some instances, higher binder content may be applied to very light weight and highly permeable fibrous products to achieve a specific binding performance. For example, fibrous products having an areal weight of less than 5 gsm (grams per square meter) and air permeability value of >200 $cc/cm^2/sec$ may contain up to 70% by weight of binder, while products having an areal weight from 5 gsm to 20 gsm may have up to 50% by weight of binder.

The binder-containing fibrous layers are dry, flexible and pre-formable fibrous products that can provide significant advantages over standard prepreg materials due their longer shelf-life and applicability to more complex geometries and flexibility around narrow radius. The presence of the binder ensures the cohesion of the fibers and the integrity of the fibrous material during the cutting/slitting and laying up steps. During cutting or slitting, the binder coating or distribution in the fibrous layer prevents the creation of fuzzy edges which can dramatically affect the process speed and throughput.

The fibrous materials for forming the preform may take the form of directional or non-directional aligned chopped or continuous fibres, woven or nonwoven fabrics, knitted fabrics, nonwoven mats, scrims, meshes, braids, yarns, or tows. Nonwoven fabrics include non-crimped fabric (NCF), which contains unidirectional tows that are stitched together. The tows may or may not touch each other such that gaps are present between tows thus providing permeations in the material. "Tow" is a bundle of fiber filaments, the number of which could be in the thousands. Nonwoven mats are formed of randomly arranged fibers which are held together by a binder, i.e. the liquid binder disclosed herein. The fibers in the nonwoven mat may be chopped fibers or swirls of continuous fiber strands.

Commercial woven or nonwoven fibrous products or fabrics with areal weight in the range of 1-2000 gsm are suitable. The fibers in the fabric may be any organic or inorganic fibers and mixtures thereof. Organic fibers include aramid fibres, metallized polymer fibres (where the polymer can be soluble or insoluble in the resin matrix), poly paraphenylene terephthalamide fibres or inorganic or a combination thereof. Inorganic fibers include glass fibres such as "E", "A", "E-CR", "C", "D", "R", "S" or quartz fibres, or fibers made of alumina, zirconia, silicon carbide, metallised glass, other ceramic materials or metals. Particularly suitable as reinforcing fibres are carbon-based fibers, including graphite fibers. Graphite or carbon fibers may also be metallized (with discontinuous or continuous metal layers). Examples of commercially available graphite fibers include those supplied by Cytec under the trade designations T650-35, T650-42 and 1300; those supplied by Toray under the trade designation T1000 and T800-H; those supplied by Hexcel under the trade designations AS4, AU4, IM9, IM8 and IM 7; and those supplied by Toho Tenax under the trade name of IM60.

The most basic layup method is hand layup, but this is quite labor intensive. Thus, it would be more efficient to fabricate the dry preform via an automated layup process such as automated tape laying (ATL) or automated fiber placement (AFP). Automated tape laying (ATL) and automated fiber placement (AFP) are processes that use computer-guided robotics to lay one or several layers of fiber tapes or tows onto a mold surface to create a part or structure.

Automated fiber placement (AFP) involves laying fibres in the form of "tows" on the surface of a molding tool that defines the shape of the composite part being manufactured. Tows are composed of fibre filaments and are usually wound on a spool. The tow is laid as a series of adjacent strips on the surface of the molding tool by a fibre placement head that moves relative to the tool under computer control to form a laminate as it builds up layers of tows on the tool. The tow is fed through a roller on the fibre placement head to compact the tow against the mould tool as it is laid. The placement head may include heating means for effecting in-situ bonding as the tow is laid down.

Automated tape laying (ATL) is an even speedier automated process in which tape, rather than single tows, is laid down continuously to form parts. The tape is an elongated strip of fibrous materials with a narrow width, for example, a width ranging from about several inches wide to as low as ¼ inch. The head for tape laying may include a spool or spools of tape, a winder, winder guides, a compaction shoe, a position sensor and a tape cutter or slitter. The head may be located on the end of a multi-axis articulating robot that moves around the tool or mandrel to which material is being applied, or the head may be located on a gantry suspended above the tool. Alternatively, the tool or mandrel can be moved or rotated to provide the head access to different sections of the tool. Tape is applied to a tool in courses, which consist of one row of material of any length at any angle. Multiple courses are usually applied together over an area or pattern and are defined and controlled by machine-control software.

ATL is generally used to manufacture flat parts or parts having a gentle curvature, whereas AFP is used to manufacture parts having a more complex surface geometry. Automated procedures such as those described above tend to be more precise and more efficient than traditional hand lay-up techniques.

A technological challenge associated with such automated processes is the need for a binder composition that can provide cohesion and integrity to the fiber layers during the slitting, handling and lay-down stages. It is believed that the liquid binder composition disclosed herein satisfies the physical, thermo-mechanical and process requirements for ATL and AFP.

To form a preform via the ATL and AFP processes, the dry fibrous materials are in the form of tapes and tows, respectively. One application of the liquid binder composition disclosed herein is to form binder-coated tapes for ATL or binder-coated tows for AFP. To make the tapes for ATL, the liquid binder may be applied onto one or both surfaces of a dry fabric web (e.g. via spraying) to form a coated fabric, and then the binder-coated fabric is slitted into elongated tapes. The presence of the binder helps to maintain cohesion of the fabric material during the slitting process and prevents fraying. To form a preform via AFP, the fibrous tows are individually coated with the liquid binder composition prior to the lay down process. The binder coating provides tack so that the tapes and tows remain in a stationary position during the lay down process. As such, the binder coating promotes the adhesion of the first laid-down tape or tow to the tooling surface as well as facilitates the bonding to a previously laid down tape or tow.

In summary, the advantages associated with the fibrous materials or fabrics that have been coated with the liquid binder composition of the present disclosure include:
 (i) Self-bond ability (or tack) in a wide range of temperatures (e.g. 70° C. -210° C.) and pressure levels (e.g. 10 N-1500 N);

(ii) Tack-free, coated fibrous materials at room temperature;
(iii) Good in-plane and through the thickness air/resin permeability;
(iv) Limited to no shrinkage;
(v) Anti-fraying behavior (i.e. no excessive fuzzing of edges) during the slitting and lay-down process steps.

EXAMPLES

The following examples are presented to further illustrate exemplary binder compositions and methods of making, but are not to be construed as limiting the invention, which is delineated in the appended claims.

Example 1

The liquid binder compositions were prepared based on the compositions shown in Table 1. All amounts are in weight percentages (wt %).

TABLE 1

Liquid binder compositions

| Component | Functionality | Binder composition (wt %) | | | | | | | |
|---|---|---|---|---|---|---|---|---|---|
| | | 1a | 1b | 1c | 1d | 1e | 1f | 1g | 1h |
| Bisphenol-F based epoxy | Di-functional epoxy | 42.1 | — | 19.7 | — | — | 18.4 | 15.8 | 15.8 |
| Phenyl-methane based epoxy | Tri-functional epoxy | — | — | — | 21.8 | 16.2 | — | — | — |
| Epoxy novolac | Tri-functional epoxy | — | — | — | 10.4 | 16.2 | — | — | — |
| Aminophenol-based epoxy | Tri-functional epoxy | — | 42.1 | 19.7 | 12.8 | 12.8 | 18.4 | 15.8 | 15.8 |
| PES:PEES copolymer | Thermoplastic polymer | 10.5 | 10.5 | 13.2 | 15.6 | 15.6 | 15.8 | 21.1 | 21.1 |
| Alkylarylsulfonate | Anionic surfactant | 1.3 | 1.3 | 1.3 | 0.9 | 0.6 | — | — | 0.6 |
| Polyoxamer PEO/PPO block copolymer | Non-ionic surfactant | 2.9 | 2.9 | 2.9 | 3.8 | 1.5 | 4.2 | 2.1 | 2.5 |
| Polyoxamine PEO/PPO block copolymer | Non-ionic surfactant | — | — | — | — | 2.1 | — | 2.1 | 1.1 |
| Deionized Water | Dispersing medium | 43.2 | 43.2 | 43.2 | 43.2 | 43.2 | 43.2 | 43.2 | 43.2 |

The anionic surfactant, alkylarylsulfonate, is based on chain-extended ethoxylated natural fatty diacid. The polyoxamer non-ionic surfactant is a AB-type block copolymer of Polyethyleneoxide (PEO) and Polypropylene oxide (PPO) with an average molecular weight in the 8000-18000 Da range. The polyoxamine non-ionic surfactant is an alkoxylated aliphatic diamine with an average molecular weight of approximately 18000-25000 Da.

With regard to the non-ionic surfactants, while the polyethyleneoxide blocks have hydrophilic behavior, the polypropylenoxide blocks ensure a strong hydrophobic behavior and better affinity to the binder composition, thereby improving the stability of the dispersion.

The liquid binder compositions were prepared by dissolving the thermoplastic polymer into the epoxy resins while applying heat to form an homogeneous molten blend. A mixture of the surfactants was then added to the molten blend, and the resulting mixture was poured into the vessel of a VMA Dispermat CN30 high-shear mixing device equipped with an open vessel connected to a recirculating heating system and operating in the 300-5500 rpm shear rate range. The mixtures were then emulsified in the mixer according to the process conditions shown in Table 2.

TABLE 2

Emulsification conditions

| Process conditions | Resin mixing | Phase inversion | Homogenization | Dilution |
|---|---|---|---|---|
| Mixer speed (rpm) | — | 400-600 | 2000-4000 | 500-700 |
| Temperature (° C.) | 100-120 | 90-100 | 80-85 | 70-80 |
| Time (min) | 40 | 40 | 60 | 20-30 |

Initially, mixing was set at a relatively low speed while gradually adding deionized water. The dispersability of water into the resulting mixture was continuously monitored until the inversion point, when a higher shear rate was applied to reduce the particles size and to ensure optimal homogenization and emulsion stability. A sufficient amount of deionized water was then added to the emulsion to achieve the target solid content. Typical emulsion physical properties are shown in Table 3.

TABLE 3

Emulsions typical physical properties

| Property | Value |
|---|---|
| Solid content [%] | 55-60 |
| Dynamic viscosity (mPa · s) | 300-600 |
| Average particle size (d50) (μm) | 0.5-5 |

Dynamic viscosity was measured according to the standard method DIN EN ISO 3219 using a Bohlin viscometer at a shear rate of 25 s$^{-1}$ at room temperature. Particle size distribution was measured using a Malvern Nanosizer S which operates in the 0.6 nm-6000 nm range.

Example 2

The binder compositions described in Example 1, were used to dip-coat a polyester stitched unidirectional non-crimp fabric of approximately 200 gsm (Saertex, Germany).

For comparison purposes, a number of commercially available binders were also used to dip coat sheets of the same unidirectional non-crimp fabric. FILCO 8004 (EP1) and 345HP (EP2) are two epoxy emulsions in water having respectively 63% and 53% solid content (available from COIM Italy). HYDROSIZE PA845 (PA1) and U2022 (PU1), are respectively a 23% solid polyamide 4,6 and a 59% solid polyurethane dispersions in water (available from Michelman, US). NEOXIL NX962D (EP3) is a 54% solid Bisphenol-A-based epoxy emulsion in water (available from DSM).

All binder-coated fabrics were dried for 3 minutes at 100° C. and for further 4 minutes at 130° C. in an oven.

The binder-coated fabrics were evaluated for drape-ability, anti-fraying behavior, shrinkage, and self-bond ability.

Drape was determined by hot-draping at 145° C. (3° C./min temperature ramp rate from room temperature) for 1 minute a 350×350 mm coated fabric onto a conic tool (height=86 mm, internal diameter=120 mm, external diameter=310 mm) under vacuum (60 mmHg vacuum throughout the test) and determining the number of creases. Materials giving creases were considered excellent (E), materials resulting in 7-12 creases were considered acceptable (A) while materials producing more than 12 creases were considered unacceptable (U). Anti-fraying behavior was determined in a developmental controlled tension fuzz tester having four sections (let-off, friction rollers, catch plate and winder) running at a speed of 20 m/min. The amount of fuzz accumulated on the catch plate over a period of 5 minutes was weighted and materials ranked accordingly. Fuzz is the debris given off by tows rubbing against the friction rollers and collected by the catch plate. Materials resulting in more than 500 mg of fuzz were considered unacceptable (U), materials giving off between 200 and 500 mg were considered acceptable (A) whereas materials creating less than 200 mg of fuzz were considered excellent (E). Shrinkage was determined by measuring the width of the pristine and binder coated fabric after a heat treatment (3 minutes at 100° C.+4 minutes at 130° C.). Materials resulting in less than 1% shrinkage were considered excellent (A), materials yielding 1-2% shrinkage were considered acceptable (B) while materials yielding more than 2% shrinkage were considered unacceptable (C). Self-bond ability was determined by applying a 10N pressure using a compaction roller at a temperature of 100° C. for 5 seconds. The results are shown in Table 4.

TABLE 4

Physical properties of coated fabrics

| Binder | Binder content (wt %) | Drape | Anti-fraying behavior | Shrinkage | Self-bond ability |
|---|---|---|---|---|---|
| EP1 | 3% | E | U | E | U |
| EP2 | 3% | E | U | E | U |
| PA1 | 3% | A | E | U | U |
| PU1 | 3% | E | U | E | E |
| EP3 | 3% | E | U | E | A |
| 1a | 3% | E | A | E | A |
| 1b | 3% | E | A | E | A |
| 1c | 3% | E | A | E | A |
| 1d | 3% | E | E | E | A |
| 1e | 3% | E | E | E | A |
| 1f | 3% | E | E | E | A |
| 1g | 3% | E | E | E | E |
| 1h | 3% | E | E | E | E |

None of the commercial epoxy-based binders (EP1, EP2 and EP3) and thermoplastic-based binders (PA1 and PU1) proved effective in maximizing the evaluated fabric physical parameters. Although good level of drape and a limited level of shrinkage were measured for most fabrics coated with commercial binders, no substantial effect on the tow integrity and the corresponding levels of fuzz was observed. Only PU1 and EP3 showed a very limited self-bondability capacity when applied at 3 wt %.

By contrast, when the binder compositions (1a-1h) described in Example 1 were applied to the unidirectional dry fabric, excellent anti-fuzz behavior and drape ability, good self-bondability performance, and no shrinkage were observed. In addition it has been found that the self-bondability performance can be further enhanced by increasing the binder content up to 10% by weight.

Example 3

Figure 1:
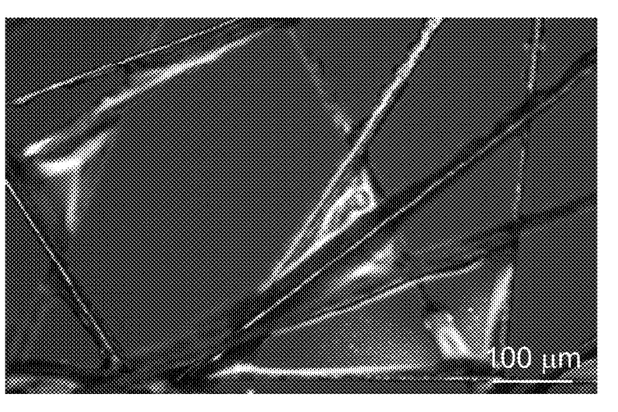
FIG. 1 is a micrograph showing a binder-coated carbon veil prepared according to an example.

Comparative Example—Effect of the Binder Composition on the Bondability of Different Fibrous Products The binder composition (1d) described in Example 1 was used to dip-coat a nonwoven carbon-fiber veil at film weight of 3 gsm (grams per square meter). The binder coated veil was dried and stabilized in an oven for four minutes at 130° C. It was found that the application of 3 gsm of the disclosed binder composition produced a homogeneous coating on each carbon fiber and created micron sized resin rich pockets at the intersection between two or more fibers. FIG. 1 shows a micrograph of the coated carbon-fiber veil. The homogeneous coating, as indicated by the shiny coating and films between the fibers, can be seen in FIG. 1.

A plurality of unidirectional Toho Tenax IMS65 carbon fibers were held unidirectionally in position on the coated veil, and the assembly was subjected to a pressure of approximately 10N by passing through a roller nip at a temperature of approximately 90-100° C. for a few seconds to assess the product bondability and stability. It was found that the assembly showed excellent stability and exhibited the ability to maintain its structure even at narrower angles and when subjected to low compression force.

For comparison, samples of the same carbon-fiber veil were coated using the commercial binders (EP1, EP2, EP3, PA1, PU1) of Example 2 at similar binder contents (about 4-10 gsm). A plurality of carbon tows were held unidirectionally in position on each of the coated veils, and the assemblies were subjected to the same test discussed above. None of the evaluated assemblies based on commercial binders achieved sufficient level of bondability.

Example 4

Each of the binder compositions (1a-1h) described in Example 1 was used to dip-coat the same unidirectional non-crimp fabric described in Example 2 at room temperature. The coated fabrics were then dried for 3 minutes at 100° C., and then for an additional 4 minutes at 130° C. in an oven.

Each of the binder-coated non-crimp fabrics was then cut into smaller plies, and the plies were laid-down in a stacking sequence to form a layup. The layup was then pre-formed in an oven at 130° C. for 30 minutes and infused with Prism® EP2400 (toughened epoxy system available from Cytec Engineered Materials). Panels (5a-5h) having a Vf (fiber volume fraction) in the 55%-57% range were produced after curing the infused preforms at 180° C. for 2 h.

For comparison purposes the same pristine (uncoated) unidirectional non-crimp fabric was used to prepare an otherwise identical test panel (Control 1). A variety of mechanical tests including 0 direction compression modulus (0 CM) and strength (0 CS) and inter-laminar shear strength (ILSS) were carried out on all of the panels and the results are shown below in Table 5.

TABLE 5

Thermo-mechanical performance of Prism ® EP2400 infused panels

| Panel code | Binder applied | Binder content (wt %) | 0 CM (GPa) EN2850 | 0CS (MPa) EN2850 | ILSS (MPa) EN2563 | $T_g$ (° C.) EN6032 |
|---|---|---|---|---|---|---|
| Control 1 | — | No binder | 134.0 | 1226 | 81.0 | 172.4 |
| 5a | 1a | 4% | 133.9 | 1213 | 81.4 | 174.1 |
| 5b | 1b | 4% | 132.9 | 1167 | 81.5 | 171.5 |
| 5c | 1c | 4% | 134.3 | 1236 | 80.0 | 172.7 |
| 5d | 1d | 4% | 131.0 | 1143 | 93.0 | 164.6 |
| 5e | 1e | 4% | 132.6 | 1298 | 92.9 | 163.9 |
| 5f | 1f | 4% | 133.6 | 1218 | 79.7 | 171.7 |
| 5g | 1g | 4% | 130.5 | 1153 | 83.2 | 170.5 |
| 5h | 1h | 4% | 130.4 | 1125 | 79.1 | 169.8 |

The application of the binder compositions (1a-1h) described in Example 1 proved to be substantially neutral, and in some cases, beneficial to the composite mechanical performance. Minor reductions in glass transition temperature ($T_g$) compared to the unmodified baseline (Control 1) were also observed.

What is claimed is:

1. A fibrous material comprising a binder composition distributed therein or coated thereon,
    wherein said fibrous material is selected from: a woven or nonwoven fabric; a nonwoven layer of randomly arranged fibers, fiber tows, yarns, braids, textile tape suitable for automated fibre placement (AFP) and/or automated tape laying (ATL),
    wherein said binder composition comprises:
    (a) one or more multifunctional epoxy resins;
    (b) at least one thermoplastic polymer that is soluble in one or more epoxy resins upon curing of the epoxy resin(s); and
    (c) a nonionic surfactant which is a block copolymer comprising hydrophilic and hydrophobic blocks,
    wherein the binder composition is present in an amount within the range of 1% to 20% by weight based on the total weight of the fibrous material, and the fibrous material is permeable to liquid resin, and
    wherein the fibrous material is a dry, flexible material that is tack-free at room temperature (20° C.-25° C.).

2. The fibrous material of claim 1, wherein the nonionic surfactant comprises a backbone moiety, and the hydrophobic and hydrophilic blocks are part of the backbone or project substantially from the backbone moiety to form grafts, or combination thereof.

3. The fibrous material of claim 1, wherein the fibrous material is a non-crimp fabric and said binder composition is coated onto at least one surface of the fabric.

4. The fibrous material of claim 1, wherein the binder composition further comprises:
    an anionic surfactant which is represented by the formula A-R,
    wherein R is an alkyl, aryl, aryl-alkyl, or an alkylene chain having 4-50 carbon atoms (C4 to C50); and A is lithium, sodium, potassium, ammonium, quaternary ammonium amine salt of a carboxylic-, or sulfonic-, or phosphoric acid group.

5. The fibrous material of claim 1, wherein the at least one thermoplastic polymer is a copolymer containing the following units:

$$X\text{-PhSO}_2\text{Ph-X-PhSO}_2\text{Ph (``PES'')} \quad \text{and} \quad (I)$$

$$X\text{-(Ph)}_a\text{-X-PhSO}_2\text{Ph (``PEES'')} \quad (II)$$

wherein X is 0 or S and may differ from unit to unit, and a is 1-4.

6. The fibrous material of claim 1, wherein the at least one thermoplastic polymer is a polyarylsulphone having a glass transition temperature ($T_g$) of greater than 150° C. as measured by Differential Scanning calorimetry (DSC).

* * * * *